US007089334B2

United States Patent
Peshkin

(12) United States Patent
(10) Patent No.: US 7,089,334 B2
(45) Date of Patent: Aug. 8, 2006

(54) INTELLIGENT NETWORK INTERFACE PORT FOR VISITING COMPUTERS

(75) Inventor: Joel D. Peshkin, Irvine, CA (US)

(73) Assignee: Mindspeed Technologies, Inc., Newport Beach, CA (US)

(*) Notice: Subject to any disclaimer, the term of this patent is extended or adjusted under 35 U.S.C. 154(b) by 653 days.

(21) Appl. No.: 09/737,142

(22) Filed: Dec. 14, 2000

(65) Prior Publication Data

US 2002/0078128 A1 Jun. 20, 2002

(51) Int. Cl.
G06F 15/16 (2006.01)
G06F 15/177 (2006.01)

(52) U.S. Cl. ............... 709/250; 709/220; 709/221
(58) Field of Classification Search ............... 709/220, 709/221, 250, 245; 710/4, 104
See application file for complete search history.

(56) References Cited

U.S. PATENT DOCUMENTS

| 5,299,314 | A | * | 3/1994 | Gates ............... 710/64 |
| 5,671,355 | A | * | 9/1997 | Collins ............ 709/250 |
| 5,896,508 | A | * | 4/1999 | Lee ............... 709/220 |
| 6,148,204 | A | * | 11/2000 | Urs et al. ........... 455/433 |
| 6,377,990 | B1 | * | 4/2002 | Slemmer et al. ...... 709/225 |
| 6,460,084 | B1 | * | 10/2002 | Van Horne et al. .... 709/227 |
| 6,510,154 | B1 | * | 1/2003 | Mayes et al. ........ 370/389 |
| 6,591,306 | B1 | * | 7/2003 | Redlich ............ 709/245 |
| 6,684,243 | B1 | * | 1/2004 | Euget et al. ........ 709/222 |
| 6,775,692 | B1 | * | 8/2004 | Albert et al. ........ 709/207 |

OTHER PUBLICATIONS

Egevang, K. et al., "RFC 1631– The IP Network Address Translator (NAT)", May 1994, pp. 1–8□□http://www.faqs.org/rfcs/rfc1631.html.*
Hall, Eric A., "Primer: An Overview of the Dynamic Host Configuration Protocol (DHCP),"CMP Media, Inc. (http://www.ehsco.com/), © 1996, pp. 1–2.
"BOOTP," internet.com Corp., (http://webopedia.internet.com/TERM/B/BOOTP.html ), © 1999–2000, pp. 1–2.
"DHCP," internet.com Corp., (http://webopedia.internet.com/TERM/D/DHCP.html ), © 1999–2000, pp. 1–2.

* cited by examiner

Primary Examiner—Jeffrey Gaffin
Assistant Examiner—Angel L. Casiano
(74) Attorney, Agent, or Firm—Christopher J. Rourk; Godwin Gruber LLP

(57) ABSTRACT

A intelligent network interface network port (INIP) is provided that enables a visiting computer to be connected to a local area network (LAN), even though the LAN is not configured to support the visiting computer. Upon detecting one of several specific types of messages, the INIP modifies the message, retransmits the modified message and notifies the visiting computer that the INIP is the appropriate target for the message, thus acting as a relay point between the visiting computer and other devices both on the LAN and accessible through it. This enables the visiting computer to transparently connect to a LAN that is not configured to support it.

22 Claims, 4 Drawing Sheets

INTELLIGENT NETWORK INTERFACE PORT FOR VISITING COMPUTERS

BACKGROUND OF THE INVENTION

1. Technical Field

The invention relates generally to an apparatus for and a method of connecting a computer to a network and, more specifically, to a network connection adapter that enables a local area network (LAN) to provide Internet access to a computer that is not a configured member of the LAN.

2. Description of the Related Art

Since computers were invented, people have been connecting them together. Computers were originally connected in resource-sharing schemes to provide multiple access to expensive resources such as printers and disk memory. Next, local area networks (LANs) were developed using a variety of protocols such as Ethernet and, then metropolitan area networks (MANs) and wide area networks (WANs) were created. Today, millions of computers are connected in the large, WAN-like architecture of the Internet, which provides users with access to an enormous amount of resources spanning the planet. The Internet is rapidly changing the way that people work, communicate and share information.

During the period when networks were developed, computers themselves were also changing. The original computers had little processing power and memory by today's standards and often filled a room the size of a warehouse. Today, computers, or workstations, have orders of magnitude more processing power and memory and can weigh only a few pounds. The combination of small, portable workstations and the networking of multiple workstations has created a number of issues. For example, when a user travels with a computer, it is often desirable to connect the computer to a network that is different than the user's typical network. This may present a problem because most networks are configured to respond to specific computers, and it is impractical to reconfigure a network each time a user is visiting with a non-local computer.

There are techniques that partially address this issue. First, developers created a bootstrap protocol ("BOOTP"). The BOOTP which enables a diskless workstation to discover an assigned internet protocol (IP) address, an IP address of a BOOTP server and the location of a boot file to be copied, or "downloaded." In this manner, the workstation can load the information it needs to operate on a host network when the workstation is powered up. However, the host network typically must maintain an assigned IP address that corresponds to a unique hardware address associated with the workstation's network interface card (NIC). In the case of a visiting computer, this is probably not the case.

Two other systems that assign IP numbers to computers on a network are the Point-to-point protocol (PPP) and the dynamic host configuration protocol (DHCP). Both PPP and DHCP are protocols in which a network server assigns an IP address upon request. The network server may assign a domain name system (DNS) server as well. These features can simplify network administration because software on the network server rather than a system administrator keeps track of IP addresses. PPP and DHCP are commonly used for dial-up computer users. However, a visiting computer may not be configured for either PPP or DHCP; and neither PPP nor DHCP address the issues faced by a computer that does not support either protocol. In addition, some computers may be configured to accept only partial; information about a DNS server from DHCP. When such a computer attempts to connect to a network that is not configured to recognize it, the computer cannot communicate with other computers on the network and cannot locate a DNS server for communication to computers outside the network.

SUMMARY OF THE INVENTION

A intelligent network interface network port (INIP) is provided that enables a visiting computer to be connected to a local area network (LAN), even though the LAN is not configured to support the visiting computer. The INIP is either a device on the LAN or connected between the visiting computer and the LAN and listens for dynamic host configuration protocol (DHCP) requests, address resolution protocol (ARP) queries and domain name service (DNS) messages. If the INIP detects a DHCP request from a visiting computer, the INIP proceeds according to DHCP standards, setting up the visiting computer by assigning an IP address to it.

If the INIP detects an ARP query, the INIP processes the query regardless of the source of the query and the query's intended target. The INIP responds to the ARP query indicating that the INIP is the requested destination of all IP traffic. Thus, all subsequent IP traffic from the visiting computer is directed to the INIP. Using techniques similar to network address translation (NAT), or "IP masquerading," the INIP rewrites the subsequent traffic employing its own configuration information, identifying itself as the originating computer and retransmitting the modified query. In addition, the INIP identifies itself to the source of the query as the appropriate target for the query. When the modified query is received by an appropriate gateway computer, the gateway computer handles the query as though it is one from a device that is a configured member of the LAN.

After servicing the request or query, the gateway computer sends any corresponding response back to the INIP, which rewrites the response with configuration and destination information appropriate to the visiting computer and then forwards the rewritten response to the visiting computer. A subsequent request or query from the visiting computer is automatically directed to the INIP, which then modifies retransmits it as explained above. The gateway directs the request or query to an appropriate destination, and responses from the original target of the query are routed through the gateway to the adapter and then forwarded to the computer. In this manner, a visiting computer, which is not a configured member of a particular LAN, can still utilize the LAN to communicate with other computers, or devices, both on the LAN and accessible through it such as devices on the Internet.

The disclosed method and apparatus can address problems confronted by a visiting computer on a LAN with regard to IP addresses, subnet masks and gateway IP addresses. Further, the method and apparatus of one embodiment solve a problem experienced by a visiting computer with regard to communicating with a domain name service (DNS) server. According to an established convention, well know to those with skill in the networking arts, a request to a DNS server is typically a user datagram (UDP) packet addressed to a computer port 52. The INIP listens for UDP packets directed to port 52 and, when such a packet is detected, the INIP rewrites the packet and redirects it to an appropriate DNS server. Responses from the DNS server are subsequently directed to the INIP, which rewrites the response and forwards it to the visiting computer that originated the DNS request. The networking of a visiting computer on a LAN that employs a different subnet mask or protocol than the computer is thus accomplished in a manner that is transparent to both the visiting computer and the user of the visiting computer.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different view.

DETAILED DESCRIPTION OF THE PREFERRED EMBODIMENTS

Figure 1:
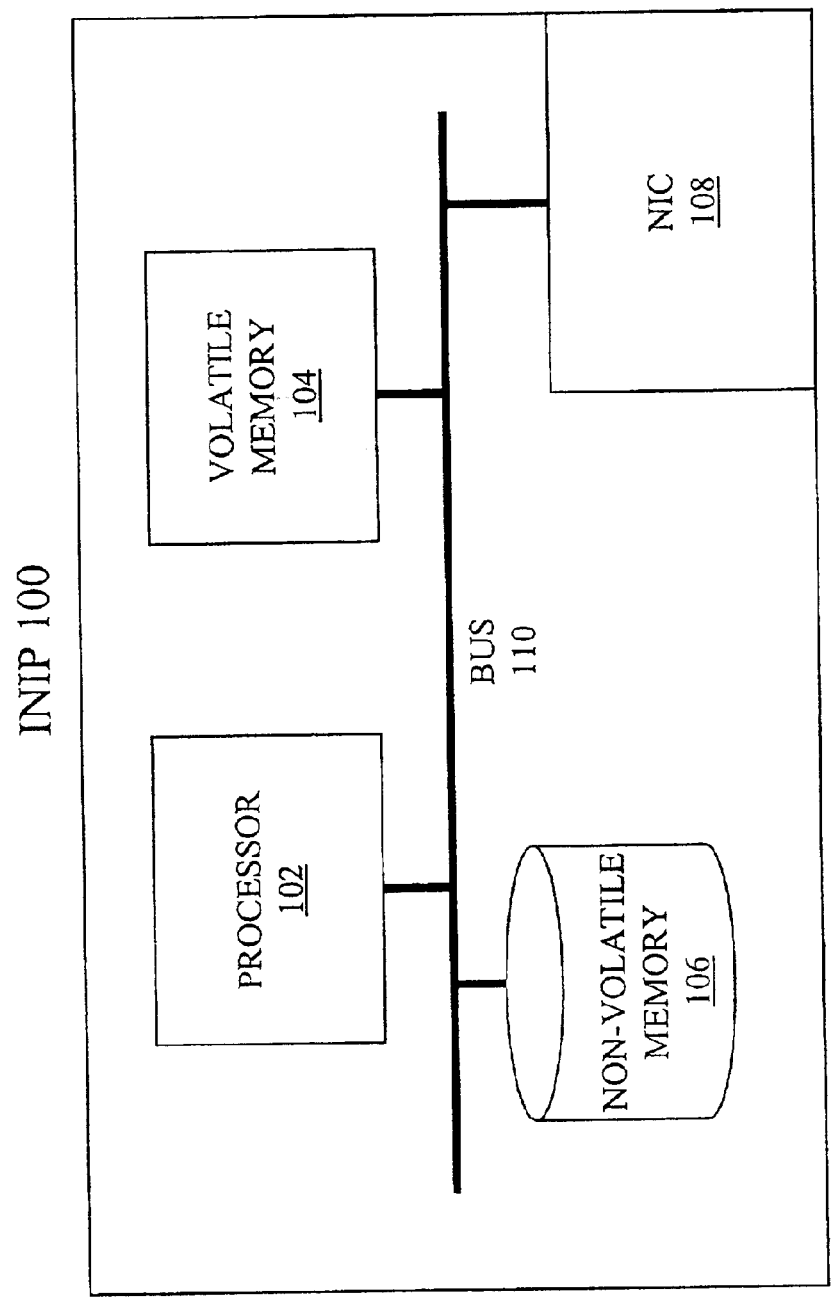
FIG. 1 illustrates an exemplary intelligent network interface port (INIP).

FIG. 1 illustrates an intelligent network interface port (INIP) 100, which includes a processor 102, a bus 110, a volatile memory 104, a non-volatile memory 106 and a network interface card (NIC) 108. Although the INIP 100 may contain additional components such as a bus controller and a serial or parallel port these additional components are not included in FIG. 1 for the sake of simplicity.

The INIP 100 implements a process 400, described in more detail below in conjunction with FIG. 4, which is stored in the non-volatile memory 106, loaded into the volatile memory 104, and executed on the processor 102. In the alternative, the process 400 may be downloaded into the volatile memory 104 from a network server through the NIC 108 when the INIP 100 is powered-up. The bus 110 connects the processor 102, the volatile memory 104, the non-volatile memory 106 and the NIC 108. The volatile memory 104 is preferably a synchronous dynamic access memory (SRAM). The non-volatile memory 106 may be an electrically erasable programmable read only memory (EEPROM) or a flash memory. The specific type, model, configuration and manufacturer of the processor 102, the volatile memory 104, the non-volatile memory 106, the NIC 108 and the bus 110 are not critical to the spirit of the invention. As will be apparent to one with skill in the computing arts, the apparatus and method of the disclosed embodiment can be implemented in a number of ways with a variety of components.

Figure 2:
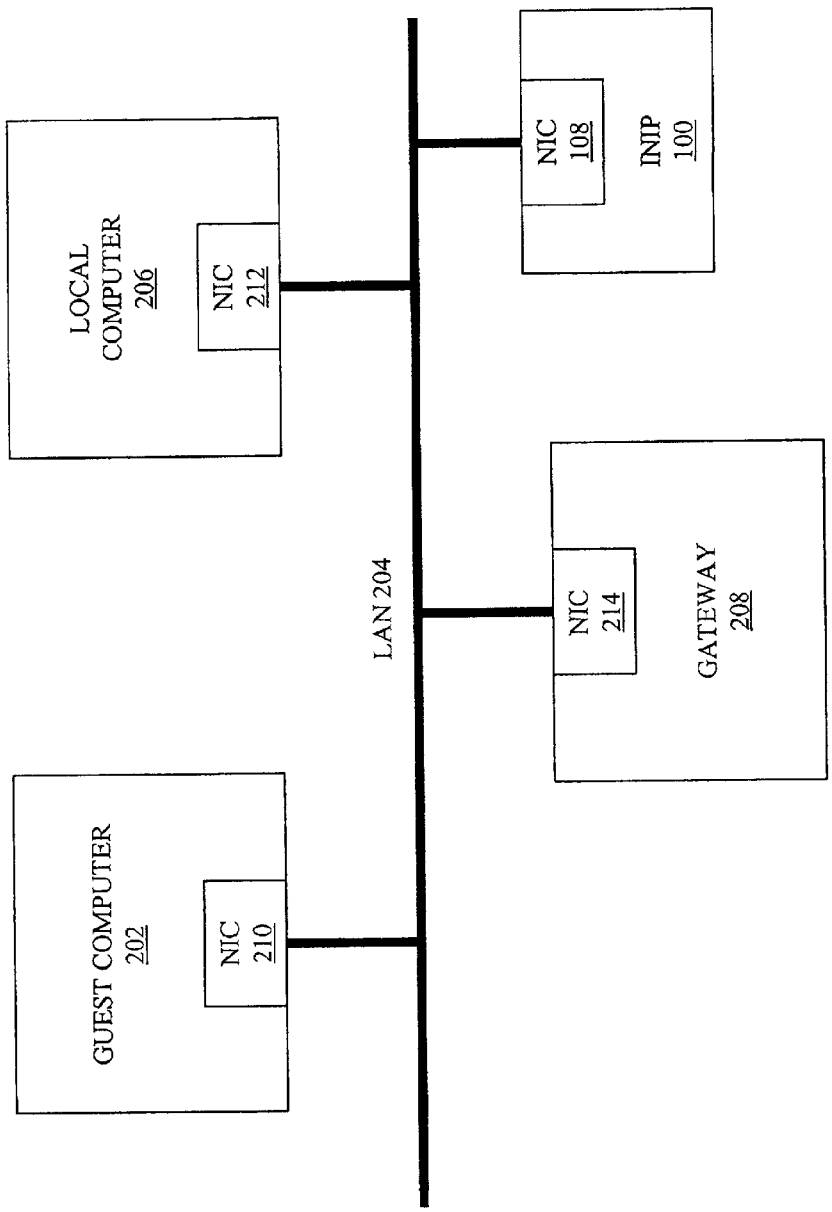
FIG. 2 illustrates an exemplary network architecture that employs the INIP.

FIG. 2 illustrates a network configuration that incorporates the INIP 100 (FIG. 1) of the disclosed embodiment. The INIP 100 is electronically connected by means of the NIC 108 to a local area network (LAN) 204. Also connected to the LAN 204 are a guest, or "visiting," computer 202, a local computer 206 and a gateway computing device, or "gateway," 208. The visiting computer 202 is connected to the LAN 204 by means of a NIC 210; the local computer is connected to the LAN 204 by means of a NIC 212; and the gateway 208 is connected to the LAN 204 by means of a NIC 214.

In this example, the LAN 204 is configured to support the local computer 206 but not the visiting computer 202. The gateway 208 can recognize a request or query from the local computer 206 because the gateway 208 has stored, or "knows," an IP address corresponding to the local computer 206 and can associated that IP address with a machine address corresponding to the NIC 212. On the other hand, the gateway 208 does not have a record of an IP address associated with the visiting computer 202 or a machine address associated with the NIC 210 and, therefore, cannot correlate the IP address of the visiting computer 202 with the machine address associated with the NIC 210.

In a typical LAN configuration, the gateway 208 serves as a relay point or portal between a local computer such as local computer 206 and other LANs and the Internet. Thus, if the visiting computer 202 does not know either the IP address or the machine address of the gateway 208, then the visiting computer 202 cannot employ the gateway 208 to communicate with another device or computer that is located on a LAN other than the LAN 204. In addition, if the gateway 208 does not know the IP address or the machine address of the visiting computer 202, a message from a device or computer on another LAN or the Internet cannot be routed by the gateway 208 to the visiting computer 202. For this reason, the visiting computer 202 is typically incommunicado even though connected to the LAN 204.

The techniques of the disclosed embodiment, as implemented by the INIP 100, address these communication problems of the visiting computer 202 by intercepting particular messages from the visiting computer 202. Current protocols for dealing with the communication problems of a visiting computer include a dynamic host configuration protocol (DHCP). DHCP is a protocol in which a network server (not shown) assigns an IP address to a visiting computer 202 upon request of the visiting computer 202. DHCP is commonly used for dial-up computers, provided that the network server can verify the identity of the visiting computer 202. Although the DHCP protocol may enable the visiting computer 202 to connect to the LAN 204, it does not enable the visiting computer 202 to connect to the LAN 204 or locate the gateway 208 or a domain name system (DNS) server (not shown) if the visiting computer is not using the DHCP protocol.

The INIP 100 monitors the LAN 204 for DHCP requests, address resolution protocol (ARP) queries and domain name server (DNS) requests. If the INIP 100 detects a DHCP request from the visiting computer 202, the INIP 100 proceeds according to DHCP standards, assigning the visiting computer 202 an IP address that it can employ to communicate with the local computer 206, the gateway 208 and other computing devices accessible through the gateway 208. Thus, if the visiting computer 202 is configured to implement DHCP protocols, the INIP 100 enable it to be configured accordingly. If the INIP 100 detects an ARP query or a DNS request, the INIP 100 processes the packet regardless of the visiting computer's 202 intended target by modifying the query, message or request and retransmitting it. The INIP 100 modifies the query, message or request by changing a source field to identify the INIP 100 instead of the visiting computer 202 as the source. The INIP 100 then identifies itself to the visiting computer 202 as an appropriate target for the query, message or request. Thus, both subsequent queries, messages and requests from the visiting computer 202 and responses to those queries, messages and requests are directed to the INIP 100 and then forwarded by the INIP 100 to the appropriate target such as the gateway 208 or the visiting computer 202 respectively. A process 400 employed by the INIP 100 to handle these types of messages is described in more detail below in conjunction with FIG. 4.

Figure 3:
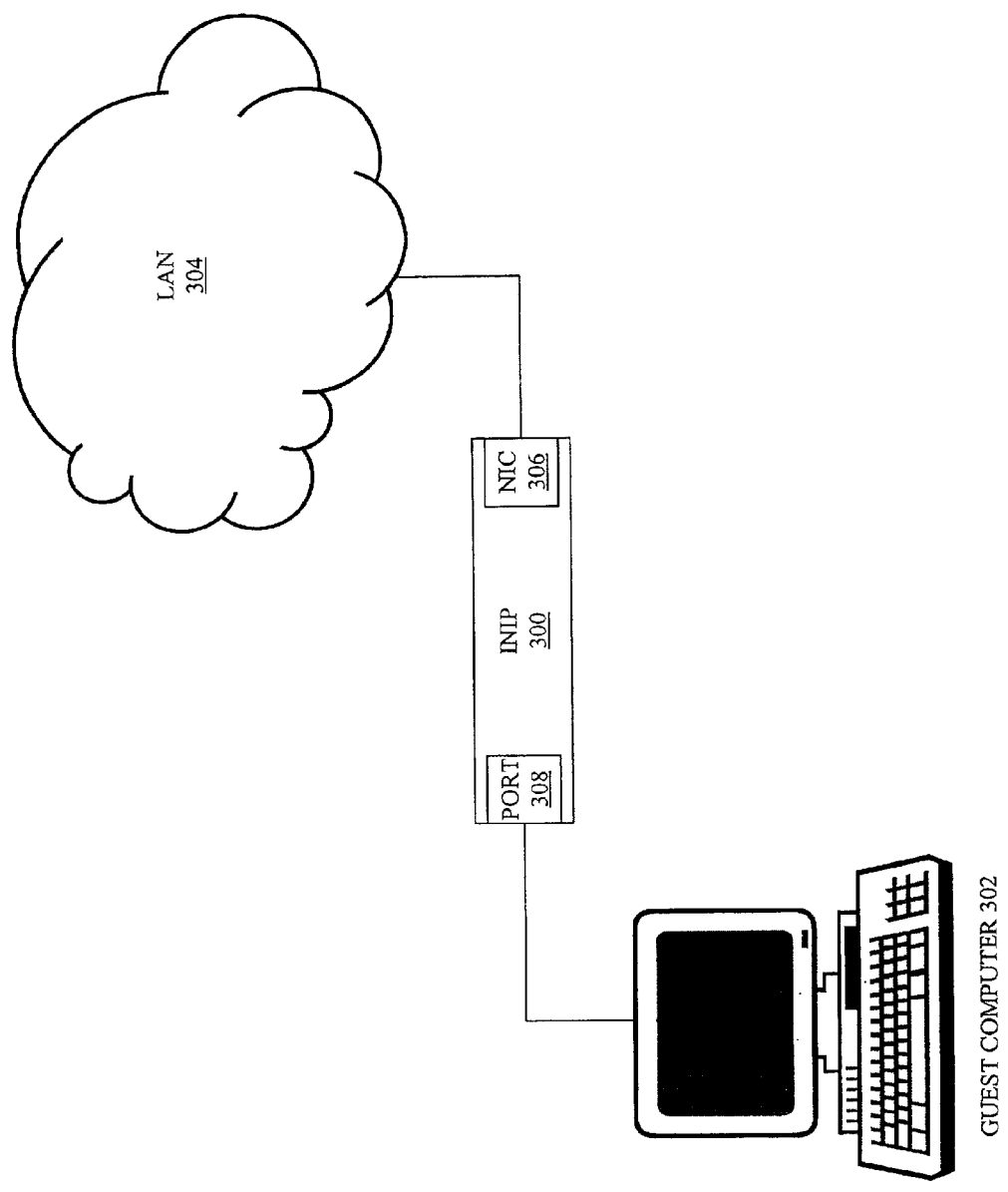
FIG. 3 illustrates a second exemplary network architecture that employs another embodiment of an INIP.

FIG. 3 illustrates an alternative network configuration that implements an INIP 300. In this example, a visiting computer 302 is electronically connected to the INIP 300, and the INIP 300 is electronically connected to a LAN 304. The INIP 303 of this example processes DHCP requests, ARP queries and DNS requests for the guest computer 302. The INIP 300 is connected to the guest computer 302 by means of a port 308, which connects to a corresponding port (not shown) on the guest computer 302. The port 308 may be a serial port or a parallel port; the specific type is not critical to the spirit of the invention. For the sake of simplicity, the INIP 300 is not shown with the components 102, 104, 106 and 110 of the INIP 100 (FIG. 1). The INIP 300 is connected to the LAN 304 by means of a NIC 306. In this configuration, a visiting computer such as computers 202 and 302 can be connected to the LAN 304 by means of the INIP 300 simply by making a connection between a port on the computer 202 or 302 respectively and the port 308. In an alternative embodiment, the INIP 300 can be an internal device of the guest computer 302 and connected directly to the guest computer's bus (not shown).

Figure 4:
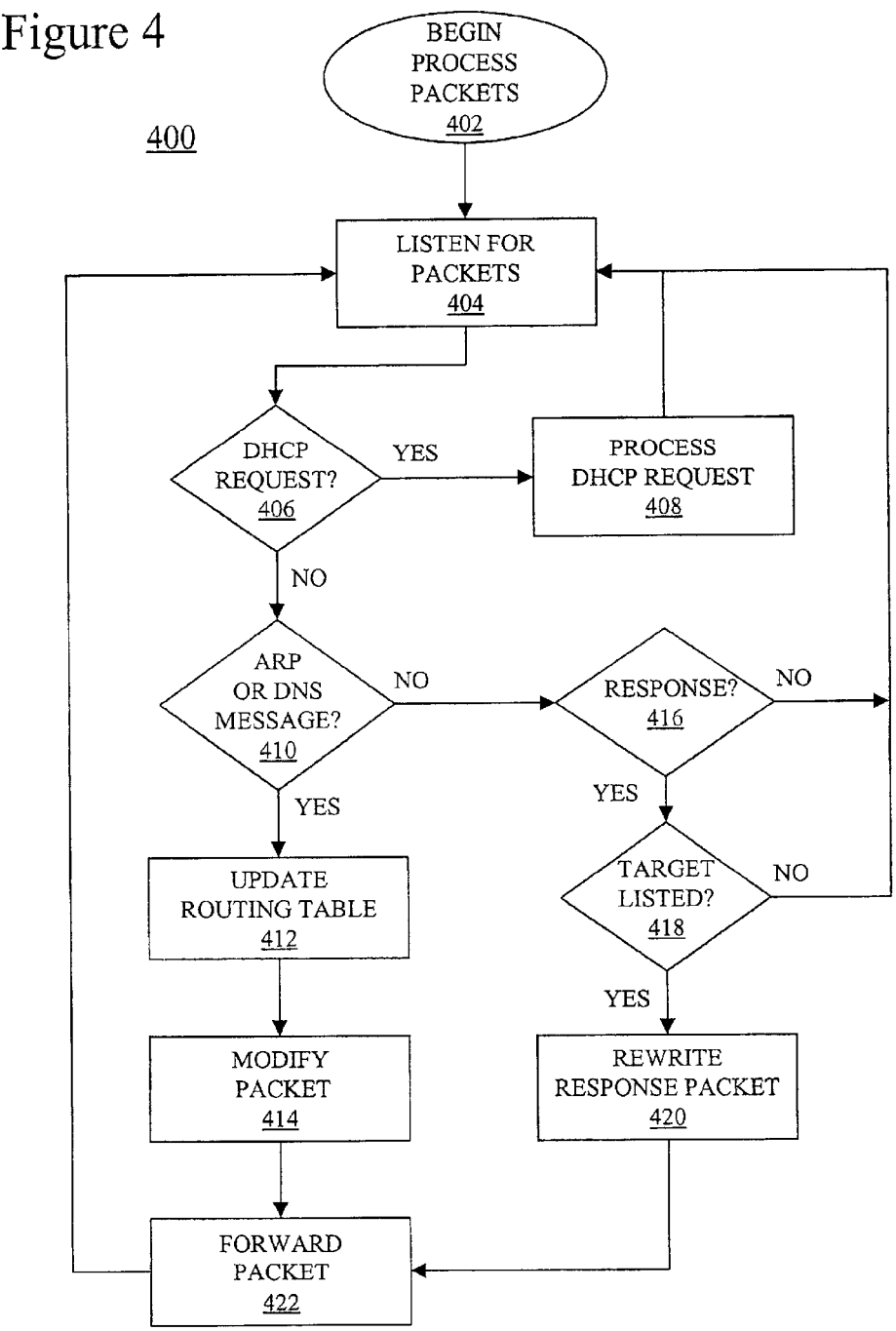
FIG. 4 is a flowchart of a process executed by the INIP to handle host configuration protocol (DHCP) packets, address resolution protocol (ARP) packets, domain name server (DNS) requests and responses from DHCP, ARP and DNS messages.

FIG. 4 is a flowchart of a process 400 that is executed by the INIP 100. The process 400 can be implemented in a number of ways such as part of an operating system, firmware, or as an application specific integrated circuit (ASIC). The specific implementation of the process 400 is not critical to the spirit of the invention. The process 400 begins in a Begin Process Packets step 402 and proceeds immediately to a Listen For Packets step 404. In step 404, the INIP 100 operates in a "promiscuous" mode or, in other words, listens to all packets transmitted on the LAN 204 (FIG. 2). Once a packet is detected on the LAN 204, the process 400 proceeds to a DHCP Request step 406 where the INIP 100 determines whether or not the detected packet is a DHCP request. If the detected packet is a DHCP request, the process 400 proceeds to a Process DHCP Request step 408 where the detected request is processed according to the DHCP protocol. In other words, the INIP 100 assigns an IP address to the visiting computer 202 and then notifies the visiting computer 202 of the assigned IP address. In subsequent communications on the LAN 204, the visiting computer 202 employs the assigned IP address. The DHCP protocol is well known to those with skill in the networking arts.

If, in step 406, the detected packet is not a DHCP request, the process 400 proceeds to an ARP or DNS Message step 410 where the INIP 100 determines whether or not the detected packet is an ARP query or an DNS request. If the detected packet is one of these two message types, then the process 400 proceeds to a Update Routing Table step 412 where the INIP 100 updates a table stored in the volatile memory 104 (FIG. 1). The table in the volatile memory 104 is updated with an assigned IP address and a corresponding machine address of the visiting computer 202 that originated the detected ARP query or the DMS request so that subsequent messages from the visiting computer 202 can be handled automatically by the INIP 100 without the need of assigning the IP address. If the table in the volatile memory 104 is updated, the INIP 100 also notifies the visiting computer 202 that the INIP 100 is the appropriate target for the corresponding message. The process 400 then proceeds to a Modify Packet step 414 where the detected packet is modified so that a field within the packet that indicates an originating device on the LAN 204 is changed to the IP address of the INIP 100 itself. The process 400 then proceeds to a Forward Packet step 422 where the INIP 100 retransmits the modified packet onto the LAN 204. In this manner, a response to the ARP or DNS message is transmitted to the INIP 100 instead of the visiting computer 202. If in step 410, the detected packet is not an ARP query or DNS request, then the process 400 proceeds to a Response step 416. It should be noted that the INIP 100 can identify a DNS request by monitoring request to a port 52, which is typically the well-known address for this type of request.

In the Response step 416, the INIP 100 determines whether or not the detected packet is a response to a previously transmitted ARP query, DNS request or other message by the visiting computer 202. If the detected packet does not correspond to a previously transmitted request, query or message from the visiting computer 202, then the process 400 proceeds to the Listen For Packets step 404 and starts over. An example of a message that would not be processed by the INIP 100 based upon the criteria defined in steps 406, 410 or 416 is a message by the local computer 206 (FIG. 1) to another computing device, other than a visiting computer such as computer 202. If, in step 416, the detected packet is a response from a previously transmitted ARP or DNS message, then the process 400 proceeds to a Target Listed step 418 where the INIP 100 determines whether or not the message detected packet is addressed to the visiting computer 202. If not, the process 400 proceeds to step 404 and starts over. In step 418, the INIP 100 determines whether or not the detected packet is addressed to the visiting computer 202 by searching the database that was updated in step 412 for the presence of a corresponding IP address and machine address. In an alternative embodiment, the INIP 100 may use its own IP address and assign a unique transmission control protocol (TCP) or user datagram protocol (UDP) port number to the visiting computer 202. Any response directed to the IP address of the INIP 100 can then be directed to the visiting computer 202 based upon the TCP or UDP port number on the response. If the INIP 100 determines that the response is addressed to the visiting computer 202, then the process 400 proceeds to a Rewrite Response Packet step 420 where the INIP 100 replaces the destination address in the response with the destination address of the visiting computer 202. The process 400 then proceeds to the Forward Packet step 422 where the INIP 100 retransmits the modified response. Once the modified response has been retransmitted, the process 400 proceeds to the Listen For Packets step 404 and begins over.

It should be noted that the process 400 does not contain a termination step because typically, once the INIP 100 begins the process 400, the INIP 400 continues to monitor the LAN 204 until the INIP 100 is disconnected from the LAN 204 or powered-down. In an alternative embodiment, the INIP 100 may contain logic to start, shut-down, suspend or resume the process 400 in response to specific commands transmitted on the LAN 204 by a network server or other computing device.

It should be apparent to those with skill in the art that the techniques and apparatus of the disclosed embodiment can be employed in situations other than a typical office LAN. For example, the described techniques and apparatus can be used to enable a visiting computer 202 to connect to a network in many environments such as a hotel room, a conference room, an airport or aboard an airplane. The techniques and apparatus of the disclosed embodiment enable a computer user to transparently connect to and make use of multiple network configurations.

While various embodiments of the application have been described, it will be apparent to those of ordinary skill in the art that many more embodiments and implementations are possible that are within the scope of this invention. Accordingly, the invention is not to be restricted except in light of the attached claims and their equivalents.

I claim:

1. An intelligent network interface port (INIP) for attachment to a first network, comprising:
   logic for listening to a plurality of messages on the first network;
   logic for determining whether a message of the plurality of messages corresponds to a particular type of message from a first computer;
   logic for modifying and retransmitting the message such that a response to the message from a second computer is transmitted to the INIP instead of the first computer; and
   logic for modifying and retransmitting the response to the first computer.

2. The INIP of claim 1, wherein the message is transmitted to a gateway device for retransmission to a second network.

3. The INIP of claim 1, wherein the first network is configured such that the first computer is not a member of the first network.

4. The INIP of claim 1, wherein the particular type of message is an address resolution protocol (ARP) query.

5. The INIP of claim 1, further comprising:
   a database for storing an address of the first computer so that the logic to modify and retransmit the message can correlate a subsequent message from the first computer to a response from a third computer.

6. The INIP of claim 1, wherein the logic for listening, the logic for determining, the logic for modifying and retransmitting the message, and the logic for modifying and retransmitting the response are application software.

7. The INIP of claim 1, wherein the INIP is not a router.

8. The INIP of claim 1, wherein the INIP is coupled between the first computer and the network.

9. The INIP of claim 1, wherein the plurality of messages are only transmitted over the first network.

10. A network adapted for connecting a visiting computer, comprising:
    a plurality of computing devices configured as a network;
    an intelligent network interface port (INIP) coupled to the network for connecting a visiting computer to the network, comprising:
    logic for listening to a plurality of messages transmitted on the network;
    logic for determining whether a message of the plurality of messages corresponds to a particular type of message from the visiting computer;
    logic for modifying and retransmitting the message such that a response to the message is transmitted to the INIP instead of the visiting computer; and
    logic for modifying and retransmitting the response to the visiting computer.

11. The network of claim 10, wherein the message is transmitted to a gateway device coupled to the network.

12. The network of claim 10, wherein the particular type of message is a address resolution protocol (ARP) query.

13. The network of claim 10, the INIP further comprising
    a database for storing an address of the visiting computer so that the logic to modify and retransmit the message can correlate a subsequent message from the visiting computer to a response from a computing device other than a computer of the plurality of computing devices.

14. The network of claim 10, wherein the logic for listening, the logic for determining, the logic for modifying and retransmitting the message, and the logic for modifying and retransmitting the response are application software.

15. The network of claim 10 further comprising a plurality of INIPs, each coupled between one of a plurality of visiting computers and the network.

16. A method for connecting a visiting computer to a network, comprising the steps of:
    listening to messages on a first network;
    determining whether a message of the plurality of messages is from a visiting computer and corresponds to a particular type of message;
    modifying a source address of the message such that the source address corresponds to a intelligent network interface port (INIP) on the first network; and
    transmitting the modified message to another device on the network.

17. The method of claim 16, further comprising the steps of:
    modifying a destination address of a response to the modified message so that the destination address corresponds to the visiting computer; and
    retransmitting the modified response.

18. The method of claim 17, wherein the response is from a second computer on a second network.

19. The method of claim 17, wherein the first network is not configured such that the visiting computer is a member.

20. The method of claim 17, wherein the particular type of message is an address resolution protocol (ARP) message.

21. The method of claim 17, further comprising:
    storing an IP address and a corresponding hardware address of the visiting computer upon detection of the particular type of message; and
    retrieving the hardware address upon receipt of the response;
    and employing the hardware address to modify the response.

22. The method of claim 16 wherein modifying the source address of the message such that the source address corresponds to the intelligent network interface port (INIP) on the first network further comprises:
    modifying the source address of the message such that the source address corresponds to one of a plurality of intelligent network interface ports (INIPs) on the first network, each INIP coupled to one of a plurality of guest computers.

* * * * *